United States Patent
Zambon et al.

(10) Patent No.: US 11,796,175 B2
(45) Date of Patent: Oct. 24, 2023

(54) METHOD FOR DESIGNING A COMBUSTION SYSTEM WITH REDUCED ENVIRONMENTALLY-HARMFUL EMISSIONS

(71) Applicant: Combustion Research and Flow Technology, Inc., Pipersville, PA (US)

(72) Inventors: Andrea C. Zambon, Philadelphia, PA (US); Balaji Muralidharan, Clinton, NJ (US); William H. Calhoon, Jr., Huntsville, AL (US); Ashvin Hosangadi, Jamison, PA (US)

(73) Assignee: Combustion Research and Flow Technology, Inc., Pipersville, PA (US)

( * ) Notice: Subject to any disclaimer, the term of this patent is extended or adjusted under 35 U.S.C. 154(b) by 0 days.

(21) Appl. No.: 18/009,118

(22) PCT Filed: Jul. 1, 2022

(86) PCT No.: PCT/US2022/035895
§ 371 (c)(1),
(2) Date: Dec. 8, 2022

(87) PCT Pub. No.: WO2023/003685
PCT Pub. Date: Jan. 26, 2023

(65) Prior Publication Data
US 2023/0194099 A1   Jun. 22, 2023

Related U.S. Application Data

(60) Provisional application No. 63/223,667, filed on Jul. 20, 2021.

(51) Int. Cl.
*F23R 3/42*   (2006.01)
*G06F 30/17*   (2020.01)
*F02C 7/22*   (2006.01)

(52) U.S. Cl.
CPC .................. *F23R 3/42* (2013.01); *F02C 7/22* (2013.01); *G06F 30/17* (2020.01)

(58) Field of Classification Search
CPC .. G06F 30/00; G06F 30/17; F23R 3/42; F02C 7/22
(Continued)

(56) References Cited

U.S. PATENT DOCUMENTS 5,640,331 A    6/1997  Dahm et al.
2005/0246190 A1  11/2005  Sandor et al.
(Continued)

FOREIGN PATENT DOCUMENTS

AT    514615 B1    10/2017
CN    107391436 A    11/2017
(Continued)

OTHER PUBLICATIONS

Zambon, Andrea C., "A Multi-Time-Scale Flamelet Progress Variable Approach in OpenNCC for Predicting NOx Applied to Commercial Supersonic Transport Combustor Designs", Aug. 24-28, 2020, AIAA Propulsion and Energy Forum, American Institute of Aeronautics and Astronautics, Inc. (Year: 2020).*

(Continued)

*Primary Examiner* — Cedric Johnson
(74) *Attorney, Agent, or Firm* — Michael Crilly, Esquire

(57) ABSTRACT

A method for designing a combustion system which emits less of at least one environmentally-harmful emission is presented. In a describing step, an injector which introduces a fuel into a combustion chamber is described via a CFD code. In a modeling step, combustion kinetics of the fuel are modeled via a pre-processing code as the fuel mixes and reacts with an oxidizer. In a first selecting step, at least one primary scalar is derived during the modeling of the combustion kinetics. In a performing step, a table look-up is
(Continued)

performed to obtain at least one data from a look-up database based on the primary scalar. In a second selecting step, at least one secondary scalar is selected in addition to the primary scalar(s). In a specifying step, at least one chemical pathway of formation or destruction for the secondary scalar is specified via a chemistry manager wherein the secondary scalar is representative of the environmentally-harmful emission(s) of the chemical pathway(s). In a utilizing step, the data is utilized to evaluate the chemical pathway(s) to quantify the environmentally-harmful emission(s). In an identifying step, an improvement to the combustion system is identified which reduces the environmentally-harmful emission(s).

23 Claims, 4 Drawing Sheets

(58) Field of Classification Search
USPC .......................................................... 703/7, 6
See application file for complete search history.

(56) References Cited

U.S. PATENT DOCUMENTS

| | | | |
|---|---|---|---|
| 2007/0239345 | A1 | 10/2007 | Bizub |
| 2010/0114457 | A1 | 5/2010 | Yamada et al. |
| 2010/0170329 | A1 | 7/2010 | Greeves |
| 2019/0174207 | A1* | 6/2019 | Cella .................. H04Q 9/00 |

FOREIGN PATENT DOCUMENTS

| | | |
|---|---|---|
| CN | 112562793 A | 3/2021 |
| KR | 10-2016-0040234 A | 4/2016 |

OTHER PUBLICATIONS

Zambon, Andrea C., "A High Fidelity Modeling Tool to Support the Design of OXY-Combustors for Direct-Fired SCO2 Cycles", Sep. 21-25, 2020, Proceedings of ASME Turbo Expo 2020, Turbomachinery Technical Conference and Exposition, GT2020, ASME. (Year: 2020).*
Calhoon, William H. Jr., "Strain Effects in partially Premixed Methane-Air Jet Flames", Jan. 5-9, 2015, AIAA SciTech Forum, 53rd AIAA Aerospace Sciences Meeting, American Institute of Aeronautics and Astronautics. (Year: 2015).*
Tacina, Robert et al., "A Lean-Direct-Injection Combustor Using a 9 Point Swirl-Venturi Fuel Injector", 2005, ISABE. (Year: 2005).*
The National Academies of Sciences, Engineering and Medicine, Commercial Supersonic Technology: The Way Ahead, The National Academies Press, 2001.
Liu, N.S., and Quealy, A., "NCC—A Multidisciplinary Design/Analysis Tool for Combustion Systems," NASA/CP-1999-208757, Jan. 1999.
HyChem, Combustion Reaction Models of Liquid Fuels, Stanford University, https://web.stanford.edu/group/haiwanglab/HyChem/.
Muralidharan, B., Zambon, A.C., Hosangadi, A., and Calhoon, W.H. Jr., "Application of a progress variable based approach for modeling non-premixed/partially premixed combustion under high-pressure conditions," AIAA/SAE/ASEE Joint Propulsion Conference, Propulsion and Energy Forum, 4560, 2018.
Calhoon, W.H., Jr., Zambon, A.C., Sekar, B., and Kiel, B., "Subgrid Scale Combustion Modeling Based on Stochastic Model Parameterization," Journal of Engineering for Gas Turbines and Power, vol. 134, 3, 2012.
Calhoon, W.H., Jr., Mattick, S.F., Kemenov, K., Menon, S., "Strain Effect in Partially Premixed Methane-Air Jet Flames," AIAA Paper No. AIAA-2015-00674, 53th AIAA Aerospace Sciences Meeting, Kissimmee, FL, Jan. 5-9, 2015.
Muralidharan, B., Zambon, A.C. and Hosangadi, A., "Extension of the Flamelet Generated Manifold Approach to Account for Heat Losses in Multiphase Combustor Simulations", AIAA/SAE/ASEE Joint Propulsion Conference, Propulsion and Energy Forum, 8366, 2019.
Godel, G., Domingo, P., and Vervisch, L. (2009), Tabulation of NOx chemistry for large-eddy simulation of non-premixed turbulent flames. Proceedings of the Combustion Institute, 32(1), 1555-1561.
Jones, W. P., and Priddin, C. H. (Jan. 1979), Predictions of the flow field and local gas composition in gas turbine combustors. In Symposium (International) on Combustion (vol. 17, No. 1, pp. 399-409). Elsevier.
Ihme, M., and Pitsch, H. (2008), Modeling of radiation and nitric oxide formation in turbulent nonpremixed flames using a flamelet/progress variable formulation. Physics of Fluids, 20(5), 055110.
Ketelheun, A., Olbricht, C., Hahn, F., and Janicka, J. (2011), NO prediction in turbulent flames using LES/FGM with additional transport equations. Proceedings of the Combustion Institute, 33(2), 2975-2982.
Pecquery, F., Moureau, V., Lartigue, G., Vervisch, L., and Roux, A. (2014). Modelling nitrogen oxide emissions in turbulent flames with air dilution: Application to LES of a non-premixed jet-flame. Combustion and Flame, 161(2), 496-509.
Efimov, D. V., de Goey, P., and van Oijen, J. A. (2018). FGM with REDx: chemically reactive dimensionality extension. Combustion Theory and Modelling, 22(6), 1103-1133.
David G. Goodwin, Harry K. Moffat, and Raymond L. Speth. Cantera: An object-oriented software toolkit for chemical kinetics, thermodynamics, and transport processes. http://www.cantera.org, 2019. Version 2.4.0.
Kerstein, A. R., "Linear-Eddy Model of Turbulent Transport 4. Structure of Diffusion-Flames," Combustion Science and Technology, vol. 81, pp. 75-96, 1992.
Shih, T.- H., Povinelli, L. A., and Liu, N.-S., "Application of Generalized Wall Function for Complex Turbulent Flows," Journal of Turbulence, vol. 4, Apr. 2003, p. 1.-16.
Liu, N.-S., Wey, C.T., and Shih, T.-H., "Time-Filtered Navier-Stokes Approach and Emulation of Turbulence—Chemistry Interaction," 51st AIAA Aerospace Sciences Meeting, Dallas TX, AIAA Paper 2013-0707.
Barlow, R. S. and Frank, J. H., Proc. Combust. Inst., 27:1087-1095 (1998).
Barlow, R. S., Frank, J. H., A. N. Karpetis, and Chen, J.-Y., "Piloted Methane/Air Jet Flames: Transport Effects and Aspects of Scalar Structure," Combust and Flame, 143:433-449 (2005).
Schneider, Ch., Dreizler, A., Janicka, J., "Flow Field Measurements of Stable and Locally Extinguishing Hydrocarbon-Fuelled Jet Flames," Combust and Flame, 135:185-190 (2003).
Sung, C.J., Law, C.K. and Chen, J.-Y., "An Augmented Reduced Mechanism for Methane Oxidation with Comprehensive Global Parametric Validation", International Symposium on Combustion, vol. 27(1), pp. 295-304, 1998.
Hosangadi, A., Lee, R.A., York, B.J., Sinha, N. and Dash, S.M., "Upwind Unstructured Scheme for Three-Dimensional Combusting Flows," Journal of Propulsion and Power, vol. 12, No. 3, pp. 494-503, 1996.
Ajmani, K., Mongia, H.C. and Lee, P., "CFD Based Design of a Filming Injector for N+3 Combustors", AIAA 2016-4783 52nd AIAA/SAE/ASEE Joint Propulsion Conference, AIAA Propulsion and Energy Forum, Salt Lake City, UT, 2016.
International Search Report issued by the Korean Intellectual Property Office under PCT Application No. PCT/US2022/035895, completed and dated Oct. 28, 2022, 3 pages.
Written Opinion issued by the Korean Intellectual Property Office under PCT Application No. PCT/US2022/035895, completed and dated Oct. 28, 2022, 3 pages.
R.R. Tacina, P.Lee and C.Wey. "A Lean-Direct-Injection Combustor Using a 9 Point Swirl-Venturi Fuel Injector." ISABE—2005-1106 (2005).

* cited by examiner

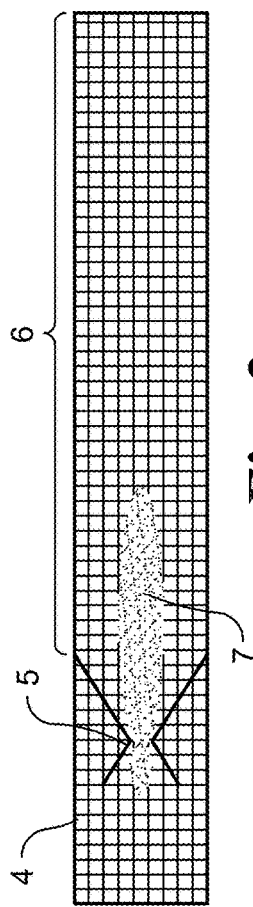

*Fig. 2*

Existing OpenNCC's ILDM Interfacing

Mixture Fraction:
$$\frac{\partial \bar{\rho} <Z>}{\partial t} + \frac{\partial \bar{\rho} <u_j><Z>}{\partial x_j} - \frac{\partial}{\partial x_j}\left(\bar{\rho}(D_T+D)\frac{\partial <Z>}{\partial x_j}\right) = \boxed{\alpha \dot{\bar{S}}_v}\; \text{New: Droplet Evaporation}$$

Primary Progress Variable:
$$\frac{\partial \bar{\rho} <Y_p>}{\partial t} + \frac{\partial \bar{\rho} <u_j><Y_p>}{\partial x_j} - \frac{\partial}{\partial x_j}\left(\bar{\rho}(D_T+D)\frac{\partial <Y_p>}{\partial x_j}\right) = \boxed{\dot{\bar{S}}_{p'}}\; \text{Finite-Rate Chemistry}$$

Mixture Fraction Variance:
$$\underbrace{\frac{\partial \bar{\rho} V_z}{\partial t} + \frac{\partial \bar{\rho}<u_j> V_z}{\partial x_j} - \frac{\partial}{\partial x_j}\left(\bar{\rho}(D_T+D)\frac{\partial <V_z>}{\partial x_j}\right) = \boxed{2\bar{\rho}D_T\frac{\partial <Z>}{\partial x_j}\frac{\partial <Z>}{\partial x_j} - \frac{2\bar{\rho}V_z \epsilon}{k}}}\; \text{Turbulence}$$

Secondary Progress Variables:
$$\underbrace{\frac{\partial \bar{\rho}<Y_{p,k}>}{\partial t} + \frac{\partial \bar{\rho}<u_j><Y_{p,k}>}{\partial x_j} - \frac{\partial}{\partial x_j}\left(\bar{\rho}(D_T+D)\frac{\partial <Y_{p,k}>}{\partial x_j}\right) = \boxed{\dot{\bar{S}}_{p,k}}}\; \text{NO}_x\; \text{Chemistry}$$

$k = 2, i progress.$

*Fig. 3*

METHOD FOR DESIGNING A COMBUSTION SYSTEM WITH REDUCED ENVIRONMENTALLY-HARMFUL EMISSIONS

CROSS REFERENCE TO RELATED APPLICATIONS

This application is a National Phase of PCT Application No. PCT/US2022/035895 filed Jul. 1, 2022 entitled Method for Designing a Combustion System with Reduced Environmentally-Harmful Emissions which further claims priority from U.S. Provisional Patent Application No. 63/223,667 filed Jul. 20, 2021 entitled Method for Designing a Propulsive System with Reduced Environmentally-Harmful Emissions which are incorporated in their entirety herein by reference thereto.

GOVERNMENT SPONSORED RESEARCH AND DEVELOPMENT

This invention was made with government support under Contract Nos. 80NSSC18C0159, 80NSSC19C0381, and 80NSSC20C0091 awarded by the National Aeronautics and Space Administration (NASA). The United States Government has certain rights in the invention.

BACKGROUND

1. Field

The disclosure generally relates to a method of reducing an environmentally-harmful emission and more particularly is concerned, for example, with quantifying at least one environmentally-harmful emission, non-limiting examples being oxides of nitrogen and particulate matter, emitted from a combustion system so as to allow improvements which reduce the environmental footprint of the combustion system.

2. Background Art

One non-limiting example of a combustion system is a flight-enabling engine wherein some forms enable less-than-supersonic flight and other forms enable faster-than-subsonic flight, the latter applicable to the next generation of non-military transportation sometimes referred to as the Commercial Supersonic Transport (CST).

The CST has received significant pushback specifically with respect to economic viability, mostly due to excessive fuel consumption, and with respect to environmental impact, mostly due to noise pollution and chemical pollutants. In view of this opposition, subsonic flight remains the preferred mode of air transport simply because subsonic aircraft consume less fuel, emit less noise, and produce less pollutants than supersonic aircraft. Therefore, the viability of non-military supersonic flight depends in no small part on improvements to supersonic propulsive systems that narrow the disparity with respect to fuel consumption, noise levels, and environmentally-harmful emissions between supersonic aircraft and subsonic aircraft.

One approach to reducing fuel consumption, noise levels, and emissions has been to optimize supersonic propulsive systems for high-altitude, cruise flight. However, these supersonic engines often operate at higher temperatures which in turn increase the production of certain emissions and oxides of nitrogen ($NO_x$) in particular. Furthermore, $NO_x$ emissions are acutely problematic at higher altitudes because they are more likely to interact with and deplete ozone in the stratosphere. The depletion of the ozone layer is an ongoing, long-term problem responsible for reducing the absorption of ultraviolet radiation. The consequences are higher rates of skin cancer in the general population and higher average temperature globally which contributes to the acceleration of climate change. These optimized propulsive systems also emit non-volatile particle matter (PM), often referred to as soot, into the atmosphere at higher altitudes where it remains for an extended period to further exacerbate climate change.

Solutions to the emissions problem of supersonic propulsive systems, and CST combustors/engines in particular, must adequately address the highly turbulent flow field within these systems in order to capture the effects of turbulence-chemistry interactions. Therefore, the solutions require a methodology based on a higher-fidelity approach so as to accurately consider combustor/engine performance in order to quantify $NO_x$ and PM emissions. Furthermore, the methodology should be computationally tractable to facilitate the broad range of parametric/trade studies needed to explore viable, emission-reducing design variables in view of competing performance and emission targets. The methodology should also address geometric parameters, non-limiting examples including defining injectors, injection patterns, and cooling liner, as well as operational parameters, one non-limiting example being alternative fuels.

In view of the numerous technical challenges inherent to faster-than-subsonic flight, what is required is a methodology which quantifies environmentally-harmful emissions so as to identify improvements that reduce these emissions by a combustion system in the form of a flight-enabling application, non-limiting examples including a turbine engine or a combustor.

Furthermore, what is required is a methodology which quantifies environmentally-harmful emissions so as to identify improvements that reduce these emissions by a combustion system in the form of a non-flight-enabling application, non-limiting examples including electric-power generators, furnaces, combustors, ground vehicles, and watercraft.

SUMMARY

An object of the disclosure is a methodology which quantifies environmentally-harmful emissions so as to identify improvements that reduce these emissions by a combustion system in the form of a flight-enabling engine, non-limiting examples including a turbine engine or a combustor.

Another object of the disclosure is a methodology which quantifies environmentally-harmful emissions so as to identify improvements that reduce these emissions by a combustion system in the form of a non-flight-enabling engine, non-limiting examples including electric-power generators, furnaces, combustors, ground vehicles, and watercraft.

In accordance with some embodiments, the method for designing a combustion system wherein the combustion system emits less of at least one environmentally-harmful emission includes the steps of describing, modeling, selecting, performing, specifying, utilizing, and identifying. In the describing step, an injector which introduces a fuel into a combustion chamber is described via a computational fluid dynamics (CFD) code. In the modeling step, combustion kinetics of the fuel are modeled via a pre-processing code as the fuel mixes and reacts with an oxidizer. In the first selecting step, at least one primary scalar is derived during the modeling of the combustion kinetics wherein the primary scalar is representative of the fuel as the fuel reacts with the oxidizer and decomposes within the combustion chamber. In the performing step, a table look-up is performed to obtain at least one data from a look-up database based on the primary scalar wherein the data is representative of a resulting flame as the fuel reacts with the oxidizer and decomposes. In the second selecting step, at least one secondary scalar is selected in addition to the at least one primary scalar. In the specifying step, at least one chemical pathway of formation or destruction for the secondary scalar is specified via a chemistry manager wherein the secondary scalar is representative of the at least one environmentally-harmful emission of the at least one chemical pathway. In the utilizing step, the data is utilized to evaluate the at least one chemical pathway to quantify the at least one environmentally-harmful emission of the modeling step. In the identifying step, an improvement to the combustion system is identified which reduces the at least one environmentally-harmful emission.

In accordance with other embodiments, the at least one environmentally-harmful emission is an oxide of nitrogen.

In accordance with other embodiments, the at least one environmentally-harmful emission is a particulate matter.

In accordance with other embodiments, the pre-processing code is based on a Flamelet Generated Manifold (FGM) formulation.

In accordance with other embodiments, the pre-processing code is based on a Linear Eddy Model counter flow (LEM-CF) model.

In accordance with other embodiments, the look-up database is a tabular form.

In accordance with other embodiments, the tabular form is multi-dimensional.

In accordance with other embodiments, the primary scalar is a combination of chemical species mass fractions.

In accordance with other embodiments, the secondary scalar is a specified environmentally-harmful emission.

In accordance with other embodiments, the data is at least one of a plurality of pre-computed thermo-chemical states representing a flame structure.

In accordance with other embodiments, the fuel decomposes at least in part via combustion.

In accordance with other embodiments, the fuel decomposes at least in part via detonation.

In accordance with other embodiments, the improvement pertains to the combustion system.

In accordance with other embodiments, the improvement pertains to function of the combustion system.

In accordance with other embodiments, the method further includes the step of implementing the improvement to the combustion system.

In accordance with other embodiments, the implementing step is a physical modification to the combustion system.

In accordance with other embodiments, the implementing step is a non-physical modification to the combustion system.

In accordance with other embodiments, the non-physical modification is a software.

In accordance with other embodiments, the non-physical modification is replacement of the fuel by another fuel.

In accordance with other embodiments, the modeling step is more computationally efficient than other methodologies lacking the selecting steps, the performing step, the specifying step, and the utilizing step.

In accordance with other embodiments, the combustion system is adapted for a flight-enabling application.

In accordance with other embodiments, the combustion system is adapted for a non-flight-enabling application.

In accordance with some other embodiments, the disclosure is a combustion system designed via the method.

Preferred embodiments of the disclosure include a hybrid methodology wherein one step implements a computationally-efficient, Multi-TimeScale/Flamelet-Progress-Variable (MTS-FPV) approach and another step utilizes a computational fluid dynamic (CFD) tool. In combination, the steps enable a high-fidelity, tractable quantification of $NO_x$ and/or PM for a combustor/engine compatible with supersonic flight. Key predictive attributes of the hybrid methodology include higher-fidelity chemical kinetic models for fuels, resolution of turbulence-chemistry interactions of the primary flame, generalized modeling of slower-evolving pollutants, and a multi-phase extension to model fuel spray injection. The MTS-FPV step relies on the solution of a reduced number of scalars regardless of the complexity of the chemical system which mitigates issues with numerical stiffness associated with chemistry integration. The MTS-FPV step also avoids the need for highly-resolved grids to resolve the flame structure. In one aspect of the disclosure, the quantification of $NO_x$ and/or PM made possible by the MTS-FPV step is both faster than and comparable in performance to higher-fidelity methodologies.

A well-known and yet unsolved challenge limiting the accurate prediction of $NO_x$ levels in turbulent flames is that the production of $NO_x$ can evolve through several different chemical pathways characterized by drastically different timescales. For example, some NO production is relatively fast within a timescale of the primary flame and other NO production in the post-flame zone evolves on a much slower timescale through other chemical routes. Since post-flame production of NO constitutes the largest portion of the overall NO emission, often more than 90%, it is important to account for all NO production routes for the accurate prediction of NO emission levels. In another aspect of the disclosure, the MTS-FPV step resolves the disparity in chemical timescales by separately resolving the multiple production routes for NO within a multi-timescale architecture.

The above and other objectives, features, and advantages of the disclosure will become better understood from the following description, appended claims, and accompanying drawings, in which like reference numerals designate the same or similar elements.

BRIEF DESCRIPTION OF THE DRAWINGS

Additional aspects, features, and advantages of the disclosure will be understood and will become more readily apparent when the disclosure is considered in light of the following description made in conjunction with the accompanying drawings.

FIG. 2 is a diagram illustrating an injector and a combustion chamber of an exemplary combustor/engine of a combustion system within a mesh for modeling the combustion kinetics by a CFD code in accordance with an embodiment of the disclosure.

FIG. 3 is a chart illustrating an interface between a CFD code and a look-up database which enables the multi-timescale feature of the method in accordance with an embodiment of the disclosure.

DETAILED DESCRIPTION

Figure 1:
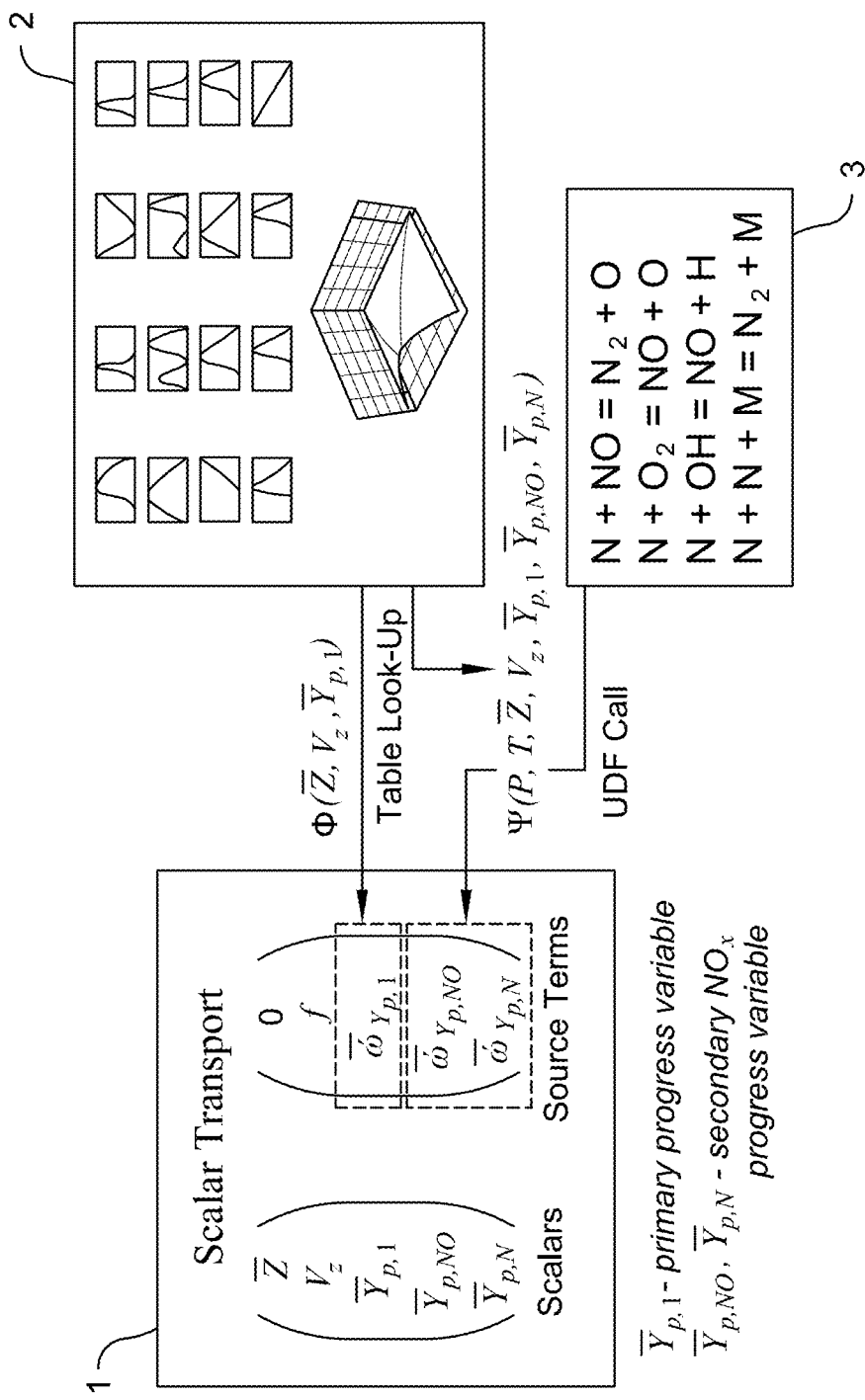
FIG. 1 is a schematic illustrating the method in accordance with an embodiment of the disclosure.

Reference will now be made in detail to several embodiments of the disclosure that are illustrated in the accompanying drawings. Wherever possible, same or similar reference numerals may be used in the drawings and the description to refer to the same or like parts.

While aspects of the disclosure are described with reference to oxides of nitrogen ($NO_x$), it is understood that aspects of the disclosure are applicable in part or whole when quantifying other emissions.

The drawing figures are drawn to provide a better understanding of the disclosure, and are not intended to be limiting in scope, but rather intended to provide exemplary illustrations.

The paper entitled "*A Multi-Time-Scale Flamelet Progress Variable Approach in OpenNCC for Predicting $NO_x$ Applied to Commercial Supersonic Transport Combustor Designs*" by A. C. Zambon, B. Muralidharan, A. Hosangadi, and K. Ajmani published in the AIAA Propulsion and Energy 2020 Forum is incorporated in its entirety herein by reference thereto.

Referring now to FIG. 1, the method for designing a combustion system with reduced environmentally-harmful emission(s) is illustrated including a step wherein a CFD code 1 models the chemical kinetics of a fuel within a combustor/engine, a step wherein a look-up database 2 enables the Multi-TimeScale (MTS), Flamelet-Progress-Variable (FPV) methodology, and a step wherein a chemistry manager 3 manages the chemical pathways responsible for the production of various $NO_x$ species during combustion and/or detonation of the fuel.

Referring now to FIGS. 1 and 2, the CFD Code 1 enables modeling of the combustion kinetics within a combustion system. For example, an injector 5 and a combustion chamber 6 may be defined within a mesh 4. One non-limiting example of an injector 5 is a nozzle. A fuel 7 is introduced into the combustion chamber 6 via the injector 5. The fuel 7 decomposes within the combustion chamber 6 via combustion and/or detonation. Non-limiting examples of the CFD code 1 include CRUNCH CFD® by Combustion Research and Flow Technology, Inc. of Pipersville, Pa. and Open National Combustion Code (OpenNCC) by the Glenn Research Center of the National Aeronautics and Space Administration (NASA). Other codes capable of solving time-dependent, Navier-Stokes equations with chemical reactions are likewise applicable.

Referring again to FIG. 1, the look-up database 2 is generated from a pre-processing code and includes a searchable collection of numerical data that is a function of one or more primary scalars. The numerical data may be arranged in table form or other suitable parameterized table form and represents pre-computed thermo-chemical states of the primary flame from which the resulting flame can be reconstructed in a flow field of a combustion system. The tabular form may be one-dimensional or multi-dimensional. The numerical data, in particular, is representative of the primary flame data wherein one or more oxides of nitrogen ($NO_x$) are quantified for the fuel 7 at various stages of decomposition. In order to accurately predict an emission, such as $NO_x$, within a computationally-tractable turbulent combustion model, the FPV approach is implemented for the primary flame and the auxiliary scalar transport equations are solved only for the $NO_x$ species in order to enable the MTS feature. These auxiliary scalars are referred to as secondary scalars. Detailed finite-rate mechanisms may be incorporated for the $NO_x$ species using the independent chemistry manager 3. The chemistry manager 3 may be implemented via the Cantera modeling framework available from Cantera Developers at the web address www.canter.org. An advantage of Cantera is that the kinetic model features supported encompass various modern reaction mechanisms. Other suitable modeling frameworks are applicable.

Referring again to FIG. 1, the transport equations for the mean mixture fraction, its variance, and mean progress variable ($\overline{Z}, V_z, \overline{Y_{p,1}}$), primary scalars, are solved in the CFD Code 1. Auxiliary progress variables (secondary scalars), such as ($\overline{Y_{p,NO}}, \overline{Y_{p,N}}$) for $NO_x$ species, are also tracked. A table look-up is performed to obtain data via the look-up database 2 to characterize the thermochemical state of the major species without including the $NO_x$ species. The $NO_x$ chemical source terms for the auxiliary transport equations are then evaluated based on the local thermochemical state using a detailed $NO_x$ chemical mechanism.

Referring again to FIG. 1, the transport equations in the CFD code 1 for the detailed species with chemical kinetics source term are replaced with transport equations for the mean mixture fraction $<Z>$, mixture fraction variance $V_z$, and chemical progress variable $<Y_{p,1}>$. The mixture fraction is a conserved scalar with no source term. The mixture fraction variance features a closed source term function of the mixture fraction gradient. The progress variable is typically defined as the sum of selected chemical species mass fractions, typically major products, and features a source term that requires closure. The value of the progress variable is considered in providing a range of solutions from non-reacting mixing to the fully-burnt state. The local physical composition of the species is obtained from a parameterized table look-up via the look-up database 2 relating these variables to the physical species composition. The parameterized table mapping the mixture fraction space to physical species is generated by solving a canonical one-dimensional counter-flow flame. For the tabulation, the solution to the flamelet equations is convolved over a probability distribution function (pdf). For any thermo-chemical quantity, φ, the mean value is computed via Equation (1).

$$<\varphi>(<Z>, V_z, <Y_p>) = \int_0^1 \varphi(Z, Y_p) P(Z; <Z>, V_z) P(Y_p) dZ \, dY_p \quad (1)$$

The form of the pdf $P(Z; <Z>, V_z)$ which results from the turbulent chemistry interactions is defined.

One approach to constructing the look-up database 2 is via the Flamelet Generated Manifold (FGM) formulation described by Muralidharan, B., Zambon, A. C., Hosangadi, A., and Calhoon, W. H. Jr. in "*Application of a progress variable based approach for modeling non-premixed/partially premixed combustion under high-pressure conditions*". This approach is based on a laminar flamelet model where the flame thickness is assumed to be small relative to the Kolmogorov scale and the small scale turbulence is assumed not to directly influence the evolution of the flame structure. The detailed species and the temperature equation are solved in the mixture fraction space. The mean or filtered species mass fraction are obtained by assuming a beta pdf for mixture fraction and integrating Equation (1) to generate a table as a function of mean mixture fraction, variance, and progress variable.

Another approach to constructing the look-up database 2 is via the more advanced and accurate Linear Eddy Model counter flow solver (LEM-CF model) described by Calhoon, W. H., Jr., Zambon, A. C., Sekar, B., and Kiel, B. in "*Subgrid Scale Combustion Modeling Based on Stochastic Model Parameterization*". This approach enables prediction of local flame extinction as well as flame blow out and is based in part on the linear-eddy model (LEM) for simulation of flame chemistry interactions in isotropic, homogeneous turbulence where turbulent convective stirring is treated stochastically. The LEM is solved within a counter-flow configuration to model global mean strain rate effects in physical space as opposed to the mixture fraction space. A key attribute is that the formulation predicts the joint scalar pdfs as a function of mean strain rate rather than assuming a distribution. This approach also resolves all length scales as in a direct numerical simulation (DNS) and is applicable to non-premixed, partially premixed, and premixed turbulent flames. Another feature of this approach is the manner in which the filtered progress variable production term is modified to account for subgrid extinction and ignition effects as $\overline{S}_p=(\overline{w}_p)(F)(G)$, where $\overline{w}_p$ is the filtered LEM-CF production rate and F and G are binary extinction and ignition functions, respectively. The binary extinction function F (F=0 or 1) implements an extinction criterion constructed from turbulent extinction limit data from the LEM-CF sub-model. This variable is a function of $<Z>$, $V_Z$ and $<Y_p>$, as well as the LES resolved scale strain rate and its time derivative. The binary ignition function G implements an ignition criterion established from flammability limits computed from the LEM-CF model.

Preferred embodiments of the method of the disclosure account for $NO_x$ production away from the flame region, $NO_x$ species coupling, generality and computational efficiency, and heat loss extension for a multiphase spray combustion.

The $NO_x$ species are understood to typically peak away from the main flame region because $NO_x$ in its various forms evolves over a much slower characteristic chemical timescale. This behavior causes the $NO_x$ species to be dominant in the post-flame region. The NO is understood to typically peak downstream of the flame region. This means that the $NO_x$ chemical source term is often weakly dependent on turbulence-chemistry interactions. Conversely, the mixture fraction variance and, therefore, the turbulent fluctuations are large in the primary flame region.

The $NO_x$ species are often coupled. NO and N are understood to be interdependent and, therefore, the source term for N is a function of NO and N. Similarly, the source term for N is dependent on both N and NO. For more complex $NO_x$ reactions mechanisms, the coupling may involve all $NO_x$ species.

The MTS-FPV step is advantageous in that the multi-timescale formulation is applicable to an arbitrary number of $NO_x$ species, as well as to soot precursors and to unburnt hydrocarbons (UHC) species. Furthermore, the MTS-FPV step is both robust and computationally efficient in that it reduces the overhead and table storage required to implement and execute the table look-up.

The fuel vapor generated during evaporation of the spray droplets may have a variability in temperature as a result of the latent heat of vaporization and the heat transfer of the droplets with the surrounding gas. The MTS-FPV step features a multiphase extension via an enhanced MTS-FPV table parameterization whereby an additional table dimension is added resulting in a four-dimensional look-up database 2. In a non-limiting example, the local temperature calculated by the CFD code 1 may appear in the parameterization of the look-up database 2 as a search key which accounts for the effect of generalized heat loss, such as induced by wall heat transfer, multi-phase heat transfer, or evaporation.

Referring again to FIG. 1, the CFD code 1 in one embodiment of the disclosure may be implemented by the OpenNCC to resolve the time-dependent, Navier-Stokes equations with chemical reactions. Second-order accurate central-differences are used for the inviscid and viscous flux discretizations, and a Jameson operator, a blend of $2^{nd}$-order and $4^{th}$-order dissipation terms, is used to maintain numerical stability. In order to enhance convergence acceleration in pseudo-time, implicit residual smoothing is used to smooth the computed residuals in OpenNCC RANS (Reynolds Averaged Navier Stokes). Turbulence closure is obtained by a two-equation cubic k-ε model with variable Cμ and generalized wall-functions with pressure-gradient effects. Time-integration of the flow equations is performed by a steady-state RANS approach, or a time-accurate Time-Filtered Navier-Stokes/Very-Large Eddy-Simulation (TFNS/VLES) approach.

Referring again to FIGS. 1 and 2, the fuel 7 is modeled via the OpenNCC by tracking spray particles in the Lagrangian framework of the mesh 4, where each particle represents a group of actual spray droplets. The governing equations for the liquid phase are based on a Lagrangian formulation where the spray particle position and velocity are described by a set of ordinary differential equations. The Lagrangian solution may be based on an unsteady spray model such that droplet groups are only integrated for a fraction of their lifetime and then restarted at the end of the last time fraction for the next iteration. The unsteady model is favored over a complete, steady-state solution.

Referring again to FIG. 1, the CFD code 1 may require enhancements to enable proper interfacing with the look-up database 2. In one example, the OpenNCC was modified to include the solution of transport equations of the mixture fraction ($<Z>$), the mixture fraction variance (Vi), the primary chemical progress variable ($<Y_p>$) and further so that the secondary progress variables for the slow-evolving $NO_x$ species are enabled. This approach leverages the existing Intrinsic Low-Dimensional Manifold (ILDM) implementation which utilizes selected scalar transport equations, namely, for the mixture fraction and the progress variable.

Referring now to FIG. 3, several modification and additions are required to OpenNCC so as to enable proper function of the CFD code 1 and the look-up database 2 within the method. In the multi-phase MTS-FPV approach, all transport equations feature a source term, namely, the mixture fraction equation which accounts for droplet evaporation and vapor formation with respect to spray injection of the fuel. Finite-rate chemistry effects are represented by the progress variable (primary and secondary) source terms, which rely on table look-up and/or direct evaluation of the NO chemistry.

Example

The method in FIG. 1 was utilized to quantify the oxides of nitrogen ($NO_x$) produced by a combustor/engine for fuels A2, RP-2, and C1. The CFD code 1 is OpenNCC. The relevant $NO_x$ subsets involving NO, N, $N_2O$ and $NO_2$ from the published HyChem A2 skeletal model with $NO_R$, as shown in TABLE 1, were extracted. The NO mass fraction distributions between the three fuels are compared in FIGS. 4a-4c. The contour plots differ with respect to small shifts in the location of the peak NO and to marginally higher amounts of NO produced by RP-2.

TABLE 1

$NO_x$ Subset from HyChem A2 REACTIONS

| | |
|---|---|
| 1 | N + OH <=> NO + H |
| 2 | N + O2 <=> NO + O |
| 3 | N + NO <=> N2 + O |
| 4 | NO + HO2 <=> NO2 + OH |
| 5 | NO + O (+M) <=> NO2 (+M) |
| 6 | NO2 + H <=> NO + OH |
| 7 | NO2 + O <=> NO + O2 |
| 8 | NO2 + NO2 <=> NO + NO + O2 |
| 9 | N2O (+M) <=> N2 + O (+M) |
| 10 | N2O + H <=> N2 + OH |
| 11 | N2O + O <=> NO + NO |
| 12 | N2O + O <=> N2 + O2 |
| 13 | N2O + OH <=> N2 + HO2 |
| 14 | N2O + NO <=> NO2 + N2 |
| 15 | CO + NO2 <=> NO + CO2 |
| 16 | CO + N2O <=> N2 + CO2 |
| 17 | CO2 + N <=> NO + CO |
| 18 | HCO + NO2 <=> NO + CO2 + H |
| 19 | HCO + NO2 <=> NO + CO + OH |
| 20 | CH3 + NO2 <=> CH3O + NO |
| 21 | CH2 + NO2 <=> CH2O + NO |
| 22 | CH2* + NO <=> CH2 + NO |
| 23 | CH2* + N2O <=> CH2O + N2 |
| 24 | C2H3 + NO2 <=> CH2CHO + NO |

Figure 4A:
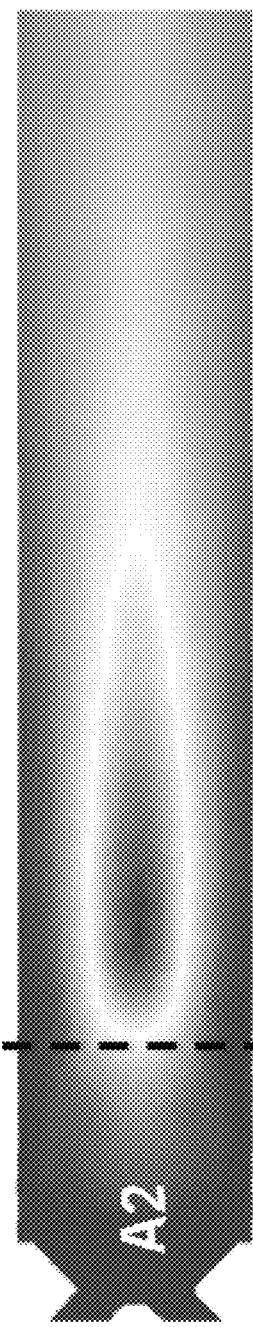
FIG. 4a is contour plot illustrating the NO mass fraction contours for A2 fuel when combusted within a combustion system as quantified by an embodiment of the disclosure.
Figure 4B:
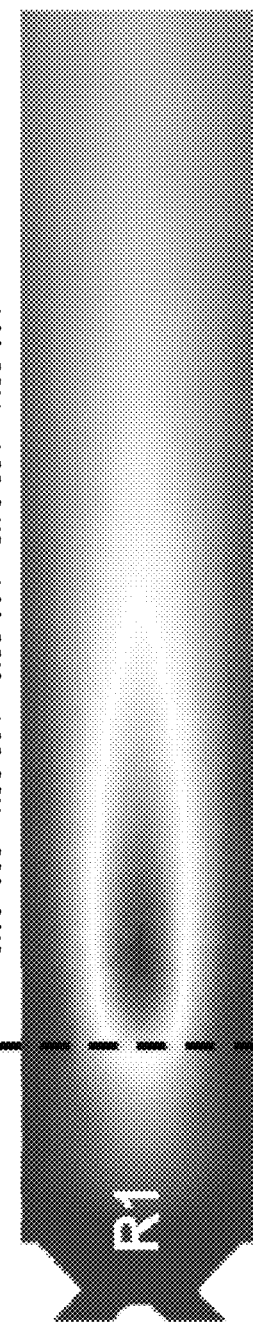
FIG. 4b is contour plot illustrating the NO mass fraction contours for RP-2 fuel when combusted within a combustion system as quantified by an embodiment of the disclosure.
Figure 4C:
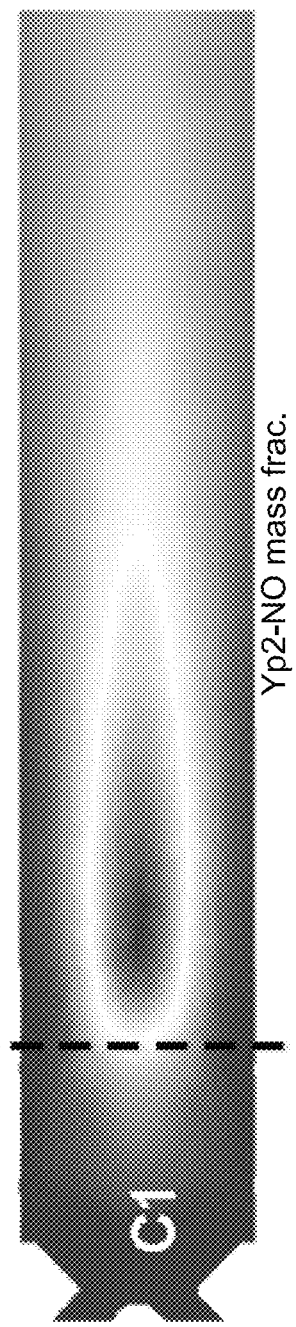
FIG. 4c is contour plot illustrating the NO mass fraction contours for C1 fuel when combusted within a combustion system as quantified by an embodiment of the disclosure.

In view of the quantified emissions represented in FIGS. 4a-4c, fuels A2 and C1 reduce the environmentally-harmful emissions specific to $NO_x$. Each fuel may be implemented as a non-physical modification to a combustion system. Another non-limiting, non-physical modification could relate to software of a combustion system. Other modifications may be possible including physical modifications to a combustion system in part or whole. Some forms of the physical and non-physical modifications may alter function of a combustion system in part or whole so as to reduce at least one environmentally-harmful emission. Other forms of the physical and non-physical modifications may reduce at least one environmentally-harmful emission without altering function of a combustion system.

Figure 5:
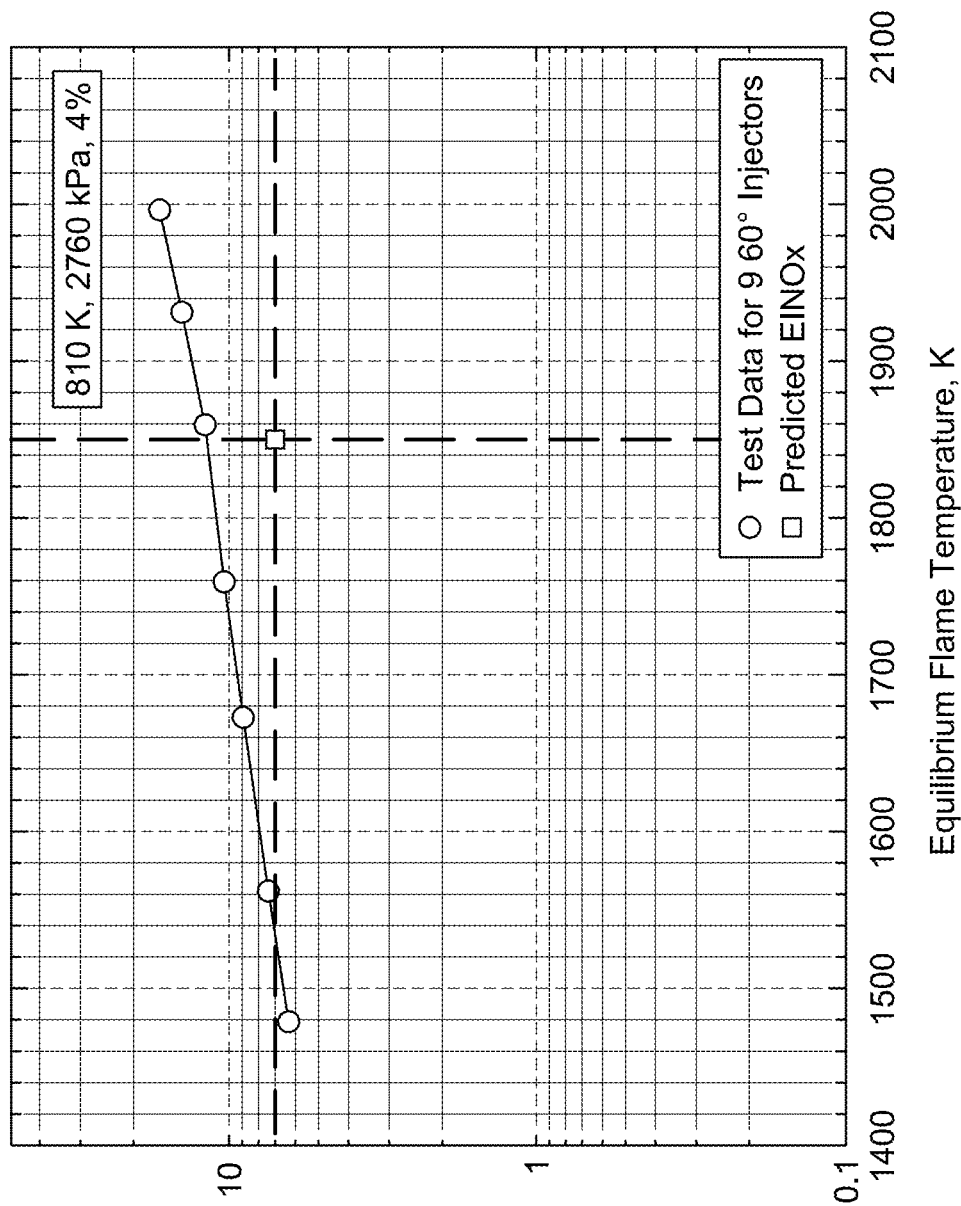
FIG. 5 is a plot comparing the $EINO_x$ quantified in FIGS. 4a-4c to experimental data by Tacina, R., Lee, P., and Wey, C. at ISABE-2005-1106 at subsonic flight scaled to supersonic flight.

The predicted values of NO, $EINO_x$ and outflow temperatures are shown in TABLE 2 together with a comparison of inflow and averaged outflow conditions for FAR and mixture fraction. The NO mass fraction amounts are of the order of $10^{-4}$, which corresponds to an $EINO_x$ value around 7. The trends in TABLE 2 correspond to observed trends in FIGS. 4a-4c. All three fuels show comparable $EINO_x$ levels. The marginally higher temperature for RP-2 is indicative of the higher production of NO. The NO quantified by the method is compared, as illustrated in FIG. 5, to NO experimentally quantified at subsonic flight conditions, as reported by Tacina, R., Lee, P., and Wey, C. at ISABE-2005-1106, with extrapolation to a supersonic temperature of approximately 1860 K. FIG. 5 indicates that $EINO_x$ levels for a multi-element configuration with spray fuel injection should be around 10. Since the analysis shown here is based on a gas-phase fuel injection, it is expected to provide a lower bound on the $EINO_x$ and a value of around 7 is deemed overall reasonable.

TABLE 2

| Gas-Phase Fuel Injection | | | | |
|---|---|---|---|---|
| | | A2 | RP2-1 | C1 |
| Inflow | FAR | 0.02900 | 0.02866 | 0.02856 |
| | Z | 0.028183 | 0.027858 | 0.027765 |
| Outflow | FAR | 0.028173 | 0.027997 | 0.027824 |
| | <Z> | 0.027401 | 0.027235 | 0.027071 |
| | <T> | 1857.15 | 1860.37 | 1858.80 |
| | $<Y_{NO}>$ | $1.61216\ 10^{-4}$ | $1.76525\ 10^{-4}$ | $1.66631\ 10^{-4}$ |
| | EINOx | 6.97 | 7.54 | 7.10 |

The Example illustrates the utility and cost-effectiveness of the method of reducing environmentally-harmful emissions by solving a reduced set of scalars for the primary flame using a mixture fraction/progress variable (FPV) approach and separately tracking the evolution of the $NO_x$ species using detailed chemistry and a multi-timescale (MTS) formulation. The decoupling of the primary flame and $NO_x$ production is viable because the associated time scales are distinctly separate and because the chemistry manager for the $NO_x$ species facilitates details of the $NO_x$ chemistry.

While the disclosure is described within the context of combustion systems enabling faster-than-subsonic flight, one non-limiting example being a gas turbine engine, it is understood that one or more embodiments of the method is/are likewise applicable to other combustion systems and other purposes wherein a fuel is combusted and/or detonated resulting in the formation of environmentally-harmful emissions. Other purposes may further include ground vehicles, non-limiting examples including trains, automobiles, and trucks, and watercraft, non-limiting examples including boats, ships, and submarines.

While the disclosure is susceptible to various modifications and alternatives, certain illustrative embodiments are shown in the drawings and are described in detail herein. It should be understood, however, there is no intention to limit the disclosure to the specific embodiments disclosed, but on the contrary, the intention is to cover all modifications, alternatives, combinations, and equivalents falling into the spirit and scope of the disclosure.

What is claimed is:

1. A method for designing a combustion system wherein said combustion system emits less of at least one environmentally-harmful emission comprising the steps of:
    (a) describing an injector which introduces a fuel into a combustion chamber via a computational fluid dynamics (CFD) code;
    (b) modeling combustion kinetics of said fuel via a pre-processing code as said fuel mixes and reacts with an oxidizer;
    (c) selecting at least one primary scalar derived during said modeling of said combustion kinetics, said primary scalar being representative of said fuel as said fuel reacts with said oxidizer and decomposes within said combustion chamber;
    (d) performing a table look-up to obtain at least one data from a look-up database based on said primary scalar, said data being representative of a resulting flame as said fuel reacts with said oxidizer and decomposes;
    (e) selecting at least one secondary scalar in addition to said at least one primary scalar;
    (f) specifying at least one chemical pathway of formation or destruction for said secondary scalar via a chemistry manager, said secondary scalar being representative of said at least one environmentally-harmful emission of said at least one chemical pathway;

(g) utilizing said data to evaluate said at least one chemical pathway to quantify said at least one environmentally-harmful emission in said modeling step; and (h) identifying an improvement to said combustion system which reduces said at least one environmentally-harmful emission.

2. The method of claim 1, wherein said at least one environmentally-harmful emission being an oxide of nitrogen.

3. The method of claim 1, wherein said at least one environmentally-harmful emission being a particulate matter.

4. The method of claim 1, wherein said pre-processing code being based on a Flamelet Generated Manifold (FGM) formulation.

5. The method of claim 1, wherein said pre-processing code being based on a Linear Eddy Model counter flow (LEM-CF) model.

6. The method of claim 1, wherein said look-up database being a tabular form.

7. The method of claim 6, wherein said tabular form being multi-dimensional.

8. The method of claim 1, wherein said primary scalar being a combination of chemical species mass fractions.

9. The method of claim 1, wherein said secondary scalar being a specified environmentally-harmful emission.

10. The method of claim 1, wherein said data being at least one of a plurality of pre-computed thermo-chemical states representing a flame structure.

11. The method of claim 1, wherein said fuel decomposes at least in part via combustion.

12. The method of claim 1, wherein said fuel decomposes at least in part via detonation.

13. The method of claim 1, wherein said improvement pertains to said combustion system.

14. The method of claim 1, wherein said improvement pertains to function of said combustion system.

15. The method of claim 1, further comprising the step of:
(i) implementing said improvement to said combustion system.

16. The method of claim 15, wherein said implementing step being a physical modification to said combustion system.

17. The method of claim 15, wherein said implementing step being a non-physical modification to said combustion system.

18. The method of claim 17, wherein said non-physical modification being a software.

19. The method of claim 17, wherein said non-physical modification being replacement of said fuel by another said fuel.

20. The method of claim 1, wherein said modeling step being more computationally efficient than other methodologies lacking said selecting steps, said performing step, said specifying step, and said utilizing step.

21. The method of claim 1, wherein said combustion system adapted for a flight-enabling application.

22. The method of claim 1, wherein said combustion system adapted for a non-flight-enabling application.

23. A combustion system designed via said method of claim 1.

\* \* \* \* \*